Fig. 2

Patented Nov. 20, 1951

2,575,958

UNITED STATES PATENT OFFICE 2,575,958

ELECTROPNEUMATIC BRAKE APPARATUS

Claude M. Hines, Verona, and Walter B. Kirk, East McKeesport, Pa., assignors to Westinghouse Air Brake Company, a corporation of Pennsylvania Application May 18, 1949, Serial No. 93,862

8 Claims. (Cl. 303—3)

This invention relates to brake equipment for railway cars adapted to be controlled from either end and to be operated individually or in trains and more particularly to the combined electropneumatic, pneumatic and dynamic type.

In the copending application of S. L. Williams et al., Serial No. 47,046, filed August 31, 1948, and assigned to the assignee of the present application, there is disclosed a brake equipment of the above general type embodying an operator's brake valve device which upon movement of the control handle into a service brake application zone is adapted to energize a dynamic brake train wire for, on each car of a train, setting up circuits to cause the car motors to act as generators for effecting simultaneously dynamic braking of all cars of the train. In the service brake application zone a master switch device is also caused to effect, over an application train wire, first simultaneous energization of application magnets, one on each car, to supply fluid under pressure to a straight air pipe extending through the train and then deenergization of said magnets when such pressure is increased to a degree corresponding to the position of the brake valve handle in the service zone. When dynamic brakes are effective, means on each car including a lock-out magnet controlled from the respective dynamic brake circuit is operative to prevent pneumatic braking of the car in response to pressure of fluid provided in the straight air pipe, except in case the pressure in the straight air pipe is increased above a certain degree at which time, by operation of an inshot means, a straight air pneumatic application of brakes will occur to a degree corresponding to the increase in straight air pipe pressure above said certain degree. The straight air pipe pressure will be increased above the certain degree just mentioned only if the dynamic brake alone will not provide a desired rate of deceleration of the car, as may occur if the car is carrying a greater than normal load.

The equipment further comprises a brake pipe adapted to be connected through the train and an emergency valve device on each car connected to said brake pipe. In a train the emergency valve devices are adapted to operate in response to an emergency reduction in brake pipe pressure, serially from car to car from the point of initiating such reduction, to effect an emergency application of brakes on the cars. The brake valve device has an emergency position for initiating such reduction in brake pipe pressure and for also deenergizing the dynamic brake wire to render ineffective the dynamic brakes on all cars of the train, since, except under the abnormal condition above mentioned, it is undesirable to have both the dynamic and pneumatic brakes effective on the car at the same time because damaging sliding of car wheels might occur. The equipment further comprises a safety handle device for a motor controller, a trip cock and a conductors valve device any one of which may be operated to initiate an emergency reduction in brake pipe pressure and thereby an emergency application of brakes throughout the train.

Still further, the equipment comprises an emergency contactor device controlled by pressure of fluid in the brake pipe, for, when the brake pipe is charged, connecting the dynamic brake means to the dynamic brake train wire and adapted to operate in response to an emergency reduction in brake pipe pressure to disconnect the dynamic brake means from the dynamic brake wire to render said dynamic brake means ineffective, and to at the same time connect the application train wire to a source of electric current not controlled by the master switch, whereby in a train all the application magnets will be simultaneously energized and remain so with the brake pipe vented. This energization of all of the application magnets of the train will open the straight air pipe throughout the train to a source of fluid under pressure on each car, as a result of which, the pressure in the straight air pipe on all cars will be simultaneously increased to source pressure and the inshot means on each car will, if the dynamic brake on the car is still effective, permit, in addition, a partial straight air pneumatic application of brakes which is undesirable from the standpoint of a possibility of slipping of the car wheel.

Now it will be seen that if, in a train, the operator's control device is in the service application zone causing the dynamic brakes on all cars to be effective and also causing the straight air pipe through the train to be charged with fluid under pressure under control of the master switch device, which however, is prevented from causing a straight air application of brakes due to operation of the lock-out magnet on each car, and an emergency reduction in brake pipe pressure is initiated by operation of any means other than the brake valve device, as for example, a trip valve device or a conductor's valve device, the emergency valve device closest to the point where the emergency reduction in brake pipe pressure is initiated will respond thereto and cause operation of the next emergency valve device and so on serially through the whole train. The emergency contactors on the cars will promptly follow the operation of the respective emergency valve devices to render the dynamic brakes ineffective serially from car to car and the first emergency contactor to operate will also connect the application train wire to the source of electric current not controlled by the master switch, whereby, promptly in response to the initiation of the emergency reduction in brake pipe pressure all of the application magnets throughout the train will be simultaneously energized to effect an increase in pressure in the straight air pipe throughout the whole train to that of the source of pressure on each car. If the straight air pipe pressure on a car is thus built up to source pressure before the emergency contactor on that car operates to render the respective dynamic brake ineffective, said car will become braked by both the dynamic and fluid pressure to a degree corresponding to the increase in straight air pipe pressure over the setting of the respective inshot means with the undesired possibility of sliding the wheels on said car, particularly if the car is empty or only slightly loaded.

More specifically, assuming that the reduction in brake pipe pressure is initiated at the first car of a train, the emergency valve devices will operate serially from car to car through the train beginning at the first car and ending with the last, and the emergency contactors will substantially instantaneously follow the emergency valve devices, whereby the dynamic brakes will be rendered ineffective from car to car on the train serially, but the first emergency contactor to operate will cause energization of all application magnets in the train simultaneously. Thus, while at the point in the train where the emergency reduction in brake pipe pressure is initiated, the dynamic brake may be rendered ineffective before the pneumatic brake on the car can become effective, this is not true at a point remote in the train since the simultaneous energization of all application magnets in the train will cause an electro-pneumatic straight air application of brakes at the remote point ahead of operation of the emergency valve device and emergency contactor at that point, hence the car at that point will be braked both pneumatically and dynamically. Such undesired dual braking may occur on a large number of cars in the train and to a greater and longer degree the further the cars are from the point where the emergency reduction in brake pipe pressure is initiated.

The principal object of the invention is therefore to provide an improved brake equipment in which such dual braking is positively prevented under the above condition and we obtain this object by the provision of improvements which causes the application magnets in the train to be energized serially from car to car along with the serial operation of the emergency valve devices and emergency contactors on the respective cars.

In order to stop a train in an emergency it is not necessary that the application magnets be energized as above described since the serial operation of the emergency valve devices will satisfactorily accomplish this end, but it is necessary that the application magnets be energized in order to release an emergency application of brakes on a car on which the air compressor is not operating and which therefore requires compressed air from another car or cars in the train to accomplish such release, as fully described in the copending application referred to above. According to the invention we retain this desirable feature by energizing the application magnets in emergency yet avoiding the possibility of sliding car wheels incident to such energization, as above described.

Other objects and advantages will become apparent from the following more detailed description of the invention.

In the accompanying drawings.

Description

The brake equipment shown in Figs. 1 to 4 of the drawings is substantially the same as that disclosed in the copending application of Williams et al. above referred to, in view of which the following description of said equipment will be limited to only such detail as necessary to clearly bring out the invention.

Figure 1:
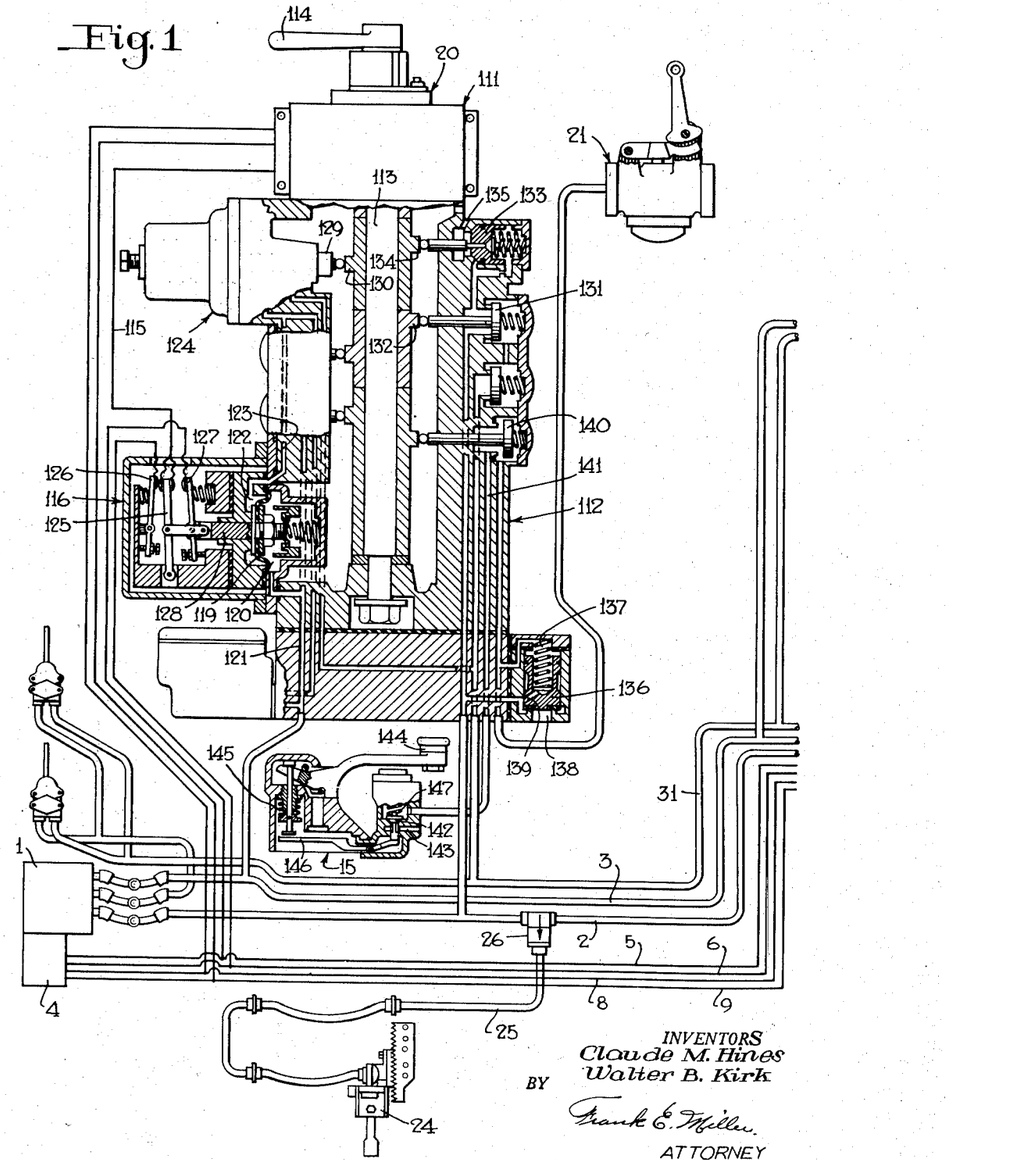
Figs. 1, 2 and 3, when arranged with the right hand edges of Figs. 1 and 2 matched to the left hand edges of Figs. 2 and 3, respectively, is a diagrammatic view, partly in section and partly in outline, of a car brake equipment embodying the invention.
Figure 2:
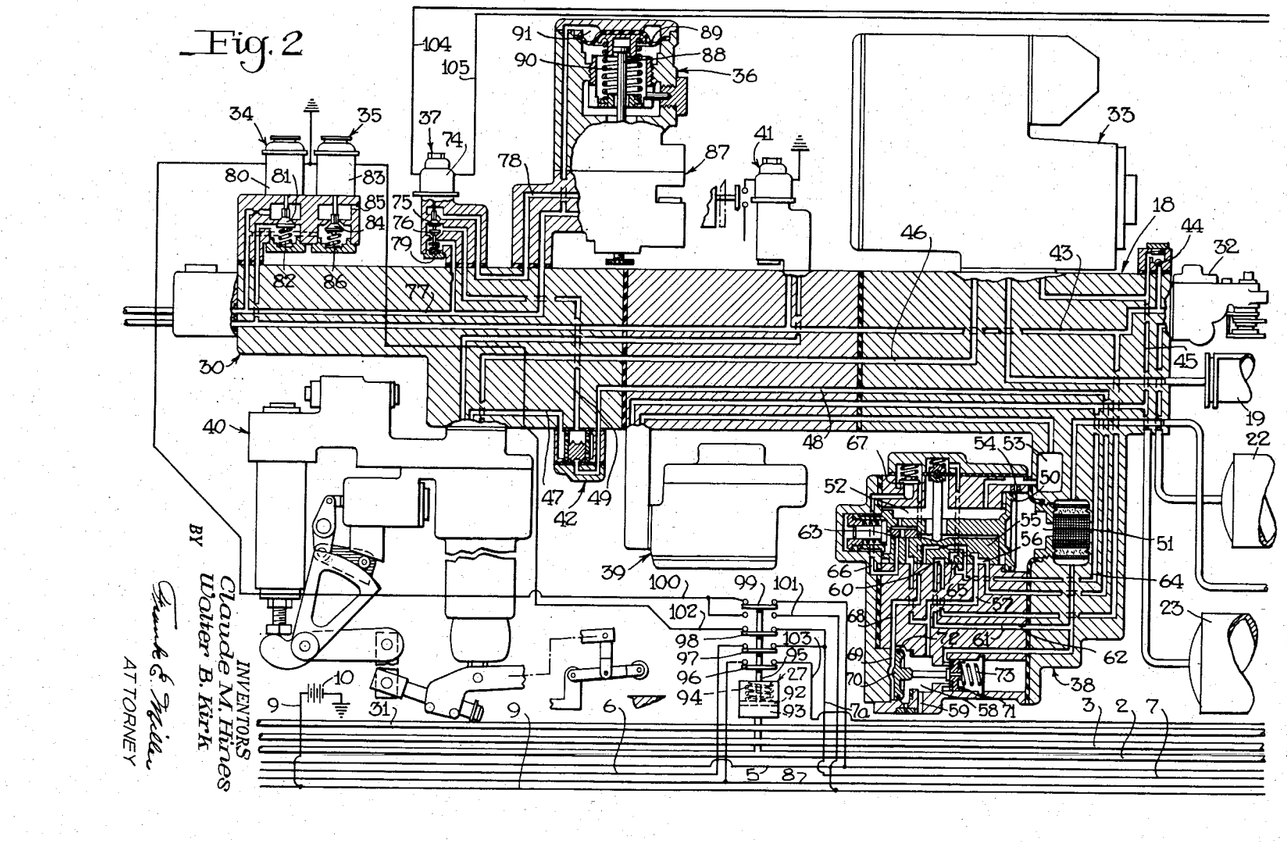
Figures 3, 4:
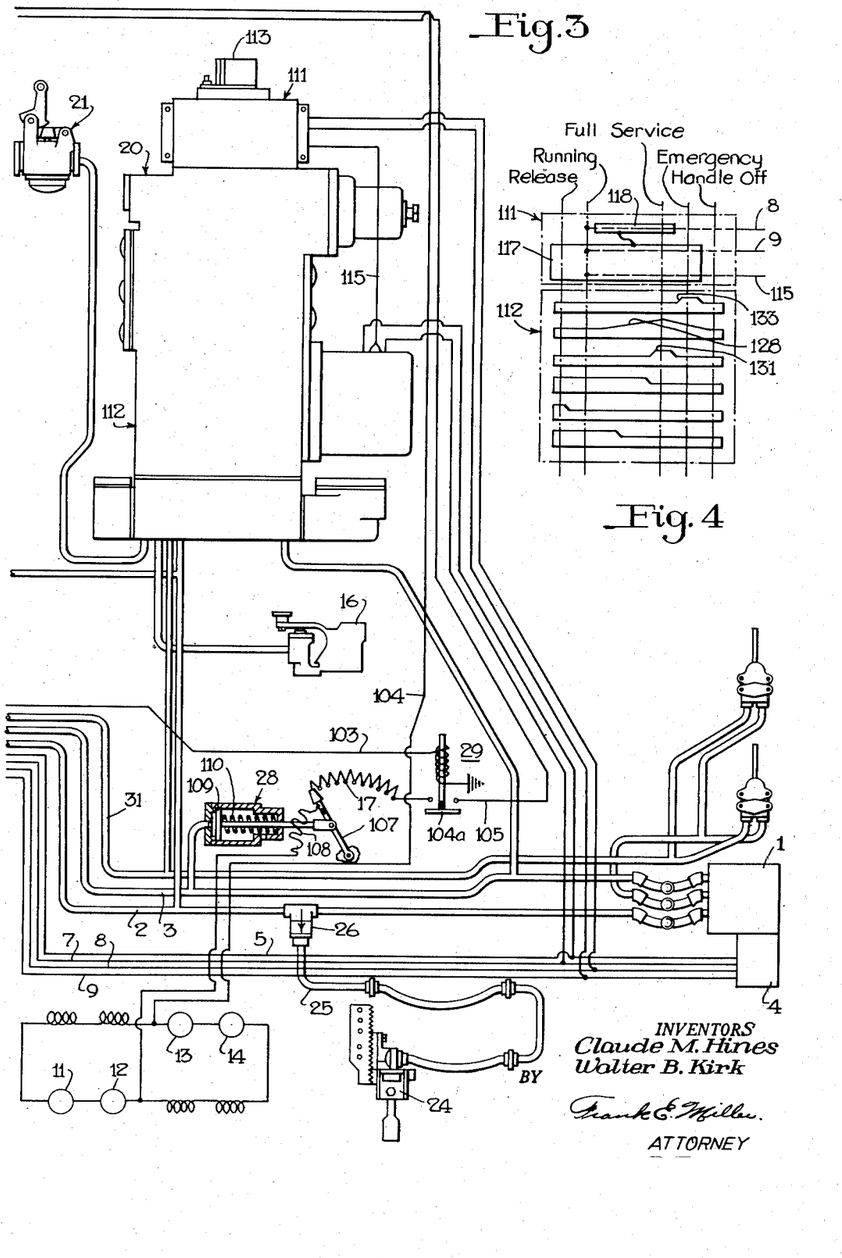
Fig. 4 is a development view of switch and valve portions of an operator's brake valve device shown in Figs. 1 and 3.

As shown in Figs. 1 and 3 of the drawings, the reference numeral 1 designates automatic car and air couplers of the usual type such as employed at each of the opposite ends of subway cars, for automatically connecting together adjacent ends of two cars and for at the same time automatically establishing through the couplers fluid pressure communications between pipes on the connected cars, such as a brake pipe 2 and a straight air pipe 3, in the present instance. Reference numeral 4 designates electric train wire connectors carried by the couplers 1 for automatically connecting train wires on one car to corresponding train wires on another car upon coupling of couplers between the cars, the wires involved in the present instance being a brake application wire 5, a brake release wire 6, 7, a dynamic brake wire 8 and an electric supply wire 9. On each car the supply wire 9 may be connected with one pole of an electric battery 10, the other pole of which may be grounded.

Reference numerals 11, 12, 13 and 14 designate electric driving motors for the car and numerals 15 and 16 designate identical motor controller handle devices, one at either end of the car, of the usual well-known safety type for controlling well-known means (not shown) to regulate supply of electric power to and thereby operation of said motors to propel the car. The motors 11 to 14 are also adapted to act as generators to supply energy to a dynamic brake resistor 17 to provide dynamic braking action on the car, as will be described later.

The brake equipment for the car comprises, in addition to the structure already mentioned, a brake controlling valve device 18 for controlling supply and release of fluid under pressure to and from a brake cylinder device 19, two identical operator's brake valve devices 20 adapted to be located at opposite ends of the car, two identical conductors valve devices 21 also adapted to be located near opposite ends of the car, a source of fluid under pressure such as in a main reservoir 22 adapted to be charged by a compressor (not shown) on the car, and a brake supply reservoir 23. The brake equipment further comprises two automatic closing trip valve devices 24 located at opposite ends of the car and each of which is connected through a pipe 25 and a check valve 26 to the brake pipe 2, said check valve being located directly in the connection with the brake pipe and being arranged to permit flow of fluid under pressure in the direction from the brake pipe to said device but to prevent flow in the opposite direction. The trip valve devices 24 may be of any desired well-known type adapted to be operated by a trip (not shown) along a railroad track for venting fluid under pressure from the brake pipe 2 and to automatically close the vent from the brake pipe when disengaged from the track trip. The brake equipment further comprises an emergency contactor 27 connected to the brake pipe 2, a dynamic brake actuator 28 and a lockout relay device 29.

The brake controlling valve device 18 comprises a pipe bracket 30 to which are connected the brake cylinder device 19, the main reservoir 22, the brake supply reservoir 23, the brake pipe 2, the straight air pipe 3, and a feed valve pipe 31 which latter pipe in addition is also connected to the two operator's brake valve devices 20. Mounted on and carried by the bracket 30 is a feed valve device 32, a brake cylinder pressure relay valve device 33, application and release magnet valve devices 34, 35, respectively, an inshot valve device 36, a lockout magnet valve device 37, an emergency valve device 38, a quick action chamber charging valve device 39, a variable load valve device 40, a reset magnet valve device 41 and a double check valve device 42.

The feed valve device 32 is adapted to receive fluid under pressure from the main reservoir 22 and to reduce this pressure to a desired degree and supply such reduced pressure to a passage 43 in the bracket 30 leading to the emergency valve device 38, to the application magnet valve device 34 and to the feed valve pipe 31 connected to the two operator's control valve devices 20. From passage 43 fluid at reduced pressure is also adapted to be supplied past a check valve 44 to a bracket passage 45 connected to the supply reservoir 23, to the emergency valve device 38 and to the brake cylinder pressure relay valve device 33.

The relay valve device 33 is adapted to respond to an increase in pressure in a passage 46 in the bracket to supply fluid under pressure from passage 45 to the brake cylinder device 19 for applying the brakes on the vehicle and is also adapted to respond to a reduction in pressure in passage 46 to release fluid under pressure from said brake cylinder device for releasing the car brakes. Supply and release of fluid under pressure to and from passage 46 is adapted to be controlled through the variable load valve device 40 from a passage 47 connected to a side outlet of the double check valve device 42, said variable load valve device being adapted to limit the pressure of fluid thus supplied from passage 47 to passage 46 to a degree corresponding to the load on the car. The reset magnet valve device 41 is provided for adjusting the variable load valve device 40 to the load on a car upon opening and subsequent closing of a car door. The opposite ends of the double check valve device 42 are connected respectively to passages 48 and 49 in the bracket 30 leading respectively to the emergency valve device 38 and to the lockout magnet valve device 37.

The emergency valve device 38 comprises a casing containing an emergency piston 50 subject on one side in a chamber 51 to pressure of fluid in brake pipe 2 and on the opposite side in a valve chamber 52 to pressure of fluid in a quick action chamber 53, the latter two chambers being charged with fluid at the pressure in said brake pipe when said piston is in a brake release position, in which it is shown in the drawing, by way of a feed port 54. A main slide valve 55 arranged for control by piston 50 is adapted when said piston is in its release position to open passage 48 to atmosphere by way of a cavity 56 in said valve, a passage 57, a chamber 58 and a passage 59. Also in this position of the main slide valve 55 a cavity 60 therein is adapted to establish a communication between feed valve passage 43 in bracket 30 and a passage 61 connected to the emergency piston chamber 51 and thereby to the brake pipe 2 for supplying fluid under pressure from the feed valve passage 43 to the brake pipe on the car at a relatively restricted rate controlled by a choke 62. Upon an emergency reduction in pressure in brake pipe 2 and thereby in piston chamber 51 of the emergency valve device the piston 50 is adapted to be moved by pressure of fluid in valve chamber 52 to an emergency position and during such movement move an auxiliary slide valve 63 relative to the main slide valve 55 to a chosen position thereon and then move said main slide valve to an emergency position. With main slide valve 55 in this emergency position the brake pipe charging communication by way of cavity 60 will be closed and bracket passage 48 will be disconnected from passage 57 and connected to a passage 64 by way of the cavity 56 and a port 65 in the main slide valve 53 whereby fluid under pressure in the supply reservoir 23 will be connected to the bracket passage 48 and thence to one end of the double check valve device 42. Also in this emergency position of the main slide valve 55 a passage 66 will be open past the left hand end of the main slide valve 55 to valve chamber 52 to permit flow of fluid under pressure from said chamber through said passage and past a check valve 67 to a passage 68 leading to a chamber 69 to therein act on and operate a vent valve piston 70 to unseat a vent valve 71 for thereby opening the brake pipe 2 to atmosphere by way of the chamber 58 and passage 59 for reducing the brake pipe pressure on the car to transmit an emergency reduction in brake pipe pressure to the emergency valve device on the next car of the train and thus serially through the train. With the parts of the emergency valve device in the release position the vent valve piston chamber 69 is vented to atmosphere through a groove 72 by-passing piston 70 to chamber 58 to permit closing of the vent valve 71 by a spring 73.

The passage 49 connected to the end of the double check valve device 42 opposite the connection with passage 48 leads to the lockout magnet valve device 37 which comprises a magnet 74 operative upon energization to open a valve 75 and at the same time close another valve 76 for disconnecting the passage 49 from a straight air pipe passage 77 in the bracket and for connecting it to a passage 78 leading to the inshot valve device 36. Upon deenergization of magnet 74 a spring 79 is adapted to open valve 76 for connecting passage 49 to passage 77 and to close valve 75 for closing communication between passage 49 and passage 78.

The application magnet valve device 34 comprises a magnet 80 operative upon energization to open a valve 81 for supplying fluid under pressure from the feed valve passage 43 in the bracket to the straight air passage 77 and thence to the straight air pipe 3 extending to the ends of the car and to the two operator's brake valve devices 20, and also from said passage to the lockout magnet valve device 37 and the inshot valve device 36. Upon deenergization of magnet 80 a spring 82 is adapted to close valve 81 for cutting off supply of fluid under pressure to passage 77.

The release magnet valve device 35 comprises a magnet 83 which is operative upon energization to open a valve 84 for connecting the straight air pipe passage 77 to an atmospheric vent port 85 for releasing fluid under pressure from said passage and thereby from the straight air pipe 3. Upon deenergization of magnet 83 a spring 86 is adapted to close valve 84.

The inshot valve means 36 comprises a self-lapping valve device 87 normally closing communication between passages 77 and 78 and adapted to operate upon depression of a control element 88 to supply fluid from the former passage to the latter at a pressure substantially proportional to the degree of such depression from a normal position in which it is shown in the drawing. The inshot valve device further comprises a flexible diaphragm 89 having a connection at one side with the element 88 and also subject on said one side to pressure of a precompressed spring 90. At the opposite side of diaphragm 88 is a chamber 91 open to the straight air pipe passage 77 in the bracket 30. Upon supply of fluid to passage 77 and thence to diaphragm chamber 91 the spring 90 is adapted to prevent deflection of diaphragm 89 and thereby movement of the control element 88 from their normal positions, in which they are shown in the drawing, until the pressure of fluid in said passage and chamber is increased to a chosen degree, such as thirty five pounds, whereupon said diaphragm will deflect in proportion to further increase in such pressure for actuating the self-lapping valve device 87 to provide fluid from passage 77 in passage 78 at a pressure corresponding to such deflection.

The emergency contactor 27 comprises a piston 92 subject on one side in a chamber 93 to pressure of fluid in brake pipe 2 and subject on the opposite side to pressure of a spring 94. When the brake pipe is substantially fully charged, the piston 92 is adapted to be moved against the spring 94 to a normal position in which it is shown in the drawing, and when at a lower degree said spring is adapted to move said piston to a lower or emergency position. The piston 92 is arranged to control through a medium of a rod 95 four movable electrical contacts 96, 97, 98 and 99.

With the piston 92 moved against spring 94 the contact 99 is adapted to connect a wire 100 from one terminal of the application magnet 80 to the application train wire 5 and when the piston 92 is in its lower position, the contact 99 is adapted to disconnect the application magnet 80 from the train wire 5 and connect same to a wire 101 which will be connected to any suitable source of electrical energy on the car such as the battery or train wire 9. The contact 98 is adapted to connect a wire 102 from the release magnet 83 to the release magnet wire 7 extending to one end of the car while the contact 97 is adapted to connect the wire 7 to the wire 6 leading to the opposite end of the car when the piston 92 is operated by brake pipe pressure, and to break such connections when said piston is operated by spring 94 upon the brake pipe being vented. When the wires 6, 7 are connected together, as just described, the two wires together constitute the release train wire extending from end to end of the car. The contact 96 is provided for connecting the dynamic brake train wire 8 to a wire 103 when the piston 92 is operated by brake pipe pressure and to break this connection when operated by spring 94.

The wire 103 is connected to one terminal of a coil of the lockout relay device 29 the other terminal of which is grounded. Upon energization of the coil of the lockout relay device a contact 104a thereof is adapted to electrically connect one side of the dynamic brake resistor 17 to a wire 105 leading to one terminal of the magnet 74 of the lockout magnet valve device 37. The other terminal of the magnet 74 is connected to a wire 104.

The dynamic brake resistor 17 comprises a resistance and a rheostat arm 107 adapted to be adjusted across said resistance and connected to a wire 108. The two wires 104 and 108 are, for the purpose of illustrating a simple dynamic brake circuit, connected across the propulsion motors 11 to 14 in such a manner that with contact 104a of the lockout relay device 29 electrically connecting resistor 17 to wire 105, said motors will act as generators to provide dynamic braking of the car.

The degree of such dynamic braking is adapted to be varied by adjustment of the rheostat arm 107 across the resistor 17, and magnet 74 of the lockout magnet valve device 37 being connected in series with said resistor is adapted to be energized by current generated by said motors when the car is operating above a chosen speed, such as 10 m. p. h. When the car speed is less than 10 m. p. h., magnet 74 of the lockout magnet valve device 37 is adapted to be deenergized.

The dynamic brake actuator 28 is provided for operating the arm 107 across the resistor 17 to vary the amount of such resistance effective during dynamic braking in inverse proportion to the pressure of fluid in the straight air pipe 3 and to this end comprises a cylinder containing a piston 109 subject on one side to pressure of fluid in the straight air pipe 3 and on the opposite side to pressure of a spring 110.

The two brake valve devices 20 are identical in construction and operation in view of which only one is shown in the drawing in section and will now be briefly described.

Each of the brake valve devices 20 comprises a casing embodying an electric contact portion 111 and a pneumatic portion 112 arranged one above the other and through both of which extends an operating shaft 113 connected at one end outside of the casing to a removable operator's control handle 114 having release, running, full service, emergency and handle-off positions arranged in the order named for counter-clockwise rotation of the handle, as shown in the development view in Fig. 4 of the drawing, the space between the running and full service positions constituting a service brake application zone. Connected to the electric portion 111 are the battery wire 9, the dynamic brake wire 8, and a third wire 115 leading to a master switch device 116 constituting a portion of the pneumatic portion of the brake valve device. The electric portion 111 comprises a movable contact 117 (Fig. 4) adapted in all positions of the handle 113 except handle-off position to connect the battery wire 9 to the wire 115 and thus to the master switch device 116. The electric portion further comprises a contact 118 arranged to connect through the medium of contact 117 the battery wire 9 to the dynamic brake wire 8 through a zone of movement of the handle 114 extending substantially from running position to substantially midway between the full service and emergency positions whereby in this zone of movement of the handle 114, the lockout relay device 29 will electrically connect wire 105 to the braking resistor 17 for effecting dynamic braking of the car and energization of magnet 74 of the lockout magnet valve device 37 with the speed of the car in excess of the chosen degree above mentioned.

The master switch device 116 comprises a flexible diaphragm 119 at one side of which is a chamber 120 open through a passage 121 to the straight air pipe 3. At the opposite side of the diaphragm 119 is a control chamber 122 connected to a passage 123 leading to a self-lapping fluid pressure control valve device 124. The master switch device 116 further comprises a movable electric contact 125 to which the wire 115 is connected and two resilient contacts 126 and 127 arranged one on either side of the movable contact 123 and connected, respectively, to the release wire 6, 7 and application train wire 5. The movable contact 125 is operably connected by a stem 128 to the diaphragm 119 for movement therewith. Upon supply of fluid to chamber 122 at a pressure in excess of that acting in chamber 120 the diaphragm 119 will move contact 125 into engagement with contact 127 for electrically connecting wire 115 to the application train wire 5 whereby with the emergency contactor 27 operated by brake pipe pressure the application magnet 80 will be connected to said train wire and thereby energized for supplying fluid under pressure to passage 77 and to the straight air pipe 3. Fluid pressure thus supplied to the straight air pipe 3 will become effective in diaphragm chamber 120 of the master switch device 116 to oppose the control pressure in chamber 122 and when the pressure of fluid in chamber 120 becomes increased to a degree substantially equal to that in chamber 122 the diaphragm 119 will deflect and move the movable contact 125 to a position out of contact with both of the contacts 126 and 127. The wire 115 will thereby be disconnected from the application train wire 5 and the application magnet 80 will be deenergized to cut off supply of fluid under pressure to the straight air pipe 3 to thereby limit the pressure of fluid obtained in the straight air pipe by operation of the application magnet valve device to a degree corresponding to that acting in chamber 122 of the master switch device 116. Upon a reduction in pressure of fluid in chamber 122 the pressure of fluid from the straight air pipe acting in chamber 120 will actuate diaphragm 118 to move contact 125 into engagement with contact 126 for, with the brake pipe contactor 27 operated by pressure of fluid in brake pipe 2, effecting energization of magnet 83 of the release magnet valve device 35 for releasing fluid under pressure from the straight air pipe 3 and thereby from chamber 120 in the master switch device 116. When the pressure of fluid in chamber 120 is thus reduced to a degree slightly lower than that effective in chamber 122, the diaphragm 118 will be operated to move contact 125 out of engagement with contact 126 for effecting deenergization of the release magnet 83 and thereby closure of the valve 84 for preventing further release of fluid under pressure from the straight air pipe 3 to thereby limit the pressure of fluid in said pipe in accordance with the reduction in pressure in diaphragm chamber 122 in the master switch device 115. If chamber 122 is completely void of fluid under pressure the contact 125 will remain in engagement with contact 126 to thereby retain the magnet 83 of the release magnet valve device 35 energized and the valve 84 open for effecting a complete release of fluid under pressure from the straight air pipe 3.

The pressure of control fluid in diaphragm chamber 122 is arranged to be controlled by the operator's handle 114 through the medium of the self-lapping fluid pressure control valve device 124. The device 124 may be of any conventional type adapted in a normal position of a control plunger 129 to open passage 123 and thereby diaphragm chamber 122 to atmosphere, and operative to supply fluid to said passage and chamber at a pressure proportional to displacement of said plunger from said normal position in the direction of the left hand. A cam 130 mounted on the shaft 113 is provided for displacing the plunger 129 from its normal position in the direction of the left hand upon movement of the operator's control handle 114, and in substantial proportion to the extent of such movement, from the running position toward the full service position, whereby upon adjustment of said handle to any position in said zone fluid will be provided in the straight air pipe 3 at a pressure substantially proportional to the extent of movement of said handle from the running position. In running position the straight air pipe 3 will be open to atmosphere.

The brake valve device 20 further comprises a brake pipe charging or emergency application release valve 131 adapted to be open by a cam 132 on shaft 113 only in the full service position of the operator's control handle 114 for establishing a communication between the feed valve pipe 31 and the brake pipe 2 for charging the latter pipe with fluid under pressure from the former pipe to move the emergency valve device 38 to its normal release position above described. The brake valve device further comprises an emergency valve 133 and a cam 134 on the shaft 113 arranged to open said valve only in the emergency position of handle 113 for establishing communication between the brake pipe 2 and atmosphere py way of a passage 135 for effecting an emergency reduction in pressure in said brake pipe and thereby operation of the emergency valve device 38 as above described.

The brake valve device further comprises a brake pipe vent valve 136 operative upon release of fluid under pressure from a chamber 137 at one side to establish a communication from the brake pipe 2 to atmosphere by way of a passage 138 for also effecting an emergency reduction in pressure in said brake pipe. The chamber 137 is normally charged with fluid under pressure from the brake pipe by way of a port 139 through said vent valve connecting said chamber at one side of the vent valve to the brake pipe acting on the oppostie side. The conductor's valve device 21 at the respective end of the car is connected to chamber 137 for operation by a conductor or passenger on the car for venting fluid under pressure from said chamber. The chamber 137 is also adapted to be normally open past a suppression valve 140 to a passage 141 leading to the motor controller handle device 15 at the same end of the car. The handle device 15 comprises a valve 142 for establishing communication between the passage 141 and a vent port 143 for releasing fluid under pressure from chamber 137 to effect operation of the vent valve 136.

The device 15 further comprises the usual depressible handle 144 arranged to be operated by a spring 145 upon release of manual pressure to actuate a lever 146 to open the valve 142. Normally the handle 144 is held depressed to permit closure of valve 141 by a spring 147. At the non-controlling end of the car the brake valve device 20 is adapted to be in the handle-off position with handle 14 removed. In this position of the brake valve device all electrical connections in portion 111 are broken and all valves closed to avoid interference with control of brakes by the brake valve device 20 at the control end of the car.

*Operation*

In operation, let it be assumed that the brake valve device 20 at the right-hand end of the equipment, as viewed in the drawing, is in handle-off position providing for control of brakes by the other brake valve device. Let it further be assumed that the main reservoir 22 is charged with fluid under pressure and that by way of the emergency application release valve 131 open only in the full service position of the operator's control handle 114, as will be described in greater detail hereinafter, the brake pipe 2 is also charged with fluid under pressure from the feed valve pipe 31, as a result of which, the emergency valve device 38 will be in its brake release position in which it is shown in the drawing and in which passage 48 connected to the lower end of the double check valve device 42 is open to atmosphere through the main slide valve 55 of the emergency valve device. With the brake pipe charged the emergency contactor 27 will be in the position connecting the application magnet 80 to the application train wire 5, also connecting the release magnet 83 to the release train wire 6, 7 and connecting the dynamic brake train wire 8 to the lockout relay device 29.

Let it be further assumed that the brake valve handle 114 on the brake valve device 20 is in either running or release position in which the emergency application release valve 131 is closed disconnecting the brake pipe 2 from the feed valve pipe 31 under which condition the brake pipe pressure will be maintained against leakage by supply from the feed valve device 32 through bracket passage 43 and cavity 60 in the main slide valve 55 of the emergency valve device 38, as before mentioned. Also in the release and running position of the brake valve handle 114 the dynamic brake train wire 8 will be disconnected from the battery supply wire 9 in the electric portion 111 of the brake valve device and the self-lapping valve device 124 will be in the position opening chamber 122 in the master switch device 116 to atmosphere whereby the movable contact 125 in said switch device will be in engagement with the release contact 126 connected to the release train wire 6, 7 and out of engagement with the application contact 127 connected to the application train wire 5. As a result, magnet 80 in the application magnet valve device 34 will be deenergized and the valve 81 closed, while magnet 83 of the release magnet valve device 35 will be energized and valve 84 open. With valve 84 open the straight air pipe 3 will be vented to atmosphere as well as passage 77 in the bracket 30 and diaphragm chamber 91 in the inshot valve device 36. With the lockout relay device 29 deenergized the circuit through the lockout magnet 74 will be open and the valve 76 therein unseated connecting passage 49 from the upper end of the double check valve device 42 to the vented passage 77 and thus to atmosphere. With the passages 48 and 49 connected to opposite ends of the double check valve device 42 thus both connected to atmosphere, passage 47 and thereby passage 46 will also be vented to atmosphere either through the passage 48 or the passage 49. With passage 46 vented to atmosphere the relay valve device 33 will open the brake cylinder device 19 to atmosphere whereby the pneumatic brakes on the car will be released, and the dynamic brake will be ineffective with the brake valve handle in either its release or running position.

Now let it be assumed that it is desired to effect a service application of brakes on the car. To accomplish this the brake valve handle 114 will be moved from running position into the zone between running and full service positions to a position corresponding to the degree of braking desired. The dynamic brake wire 8 will thereby be supplied with electric current for operating the lockout relay valve device 29 to close the dynamic brake circuit through the motors 11 to 14, the dynamic brake resistor 17 and the lockout magnet 73 for effecting dynamic braking of the car. Also in this position of the brake valve handle 114, the self-lapping valve device 124 will operate to supply fluid to the master switch device 116 at a pressure corresponding to the position of said handle, and said switch device will accordingly operate to effect first energization and then deenergization of magnet 80 of the application magnet device 34 to provide fluid at a corresponding pressure in the straight air pipe 3. Fluid thus supplied to the straight air pipe 3 will flow to chamber 109 of the dynamic brake actuator 28 for moving the rheostat arm 107 relative to the resistor 17 for adjusting said resistance according to the pressure of such fluid to thereby provide dynamic braking on the car accordingly.

The lockout magnet 74 being energized with the dynamic brake effective above a certain speed of the car will close valve 76 and open valve 75 whereby fluid supplied to straight air pipe passage 77 in bracket 30 will be prevented from flowing past valve 76 to passage 49 leading to the upper end of the double check valve device 42. Fluid supplied to passage 77 will however become effective in chamber 91 in the inshot valve device 36. If the position of the brake valve handle 114 is such that the pressure of fluid obtained in the straight air pipe 3 and in chamber 91 of the inshot valve device 36 is less than a chosen degree, such as 35 pounds, the self-lapping valve device 87 will however prevent flow of fluid under pressure from the passage 77 to passage 78 and thence to passage 48 past the open magnet valve 75 whereby the car will be braked only by the dynamic brake. If however, the load on the car is such as to require a greater degree of braking, as a result of which the handle 114 will be moved further in the direction of full service position, the pressure of fluid in the straight air pipe 3 and thereby in diaphragm chamber 91 will be increased and effect displacement of the control element 88 from its normal position in accordance with such increase and thereby actuate the self-lapping valve device 87 to supply fluid from passage 77 to passage 78 at a pressure equal to the increase over the 35 pounds above mentioned. Fluid under pressure thus provided in passage 78 will flow past the open valve 75 in the lockout magnet valve device 37 to passage 49 and one end of the double check valve device 42. Passage 48 connected to the opposite end of the double check valve device 42 being open to atmosphere at this time by way of the emergency valve device 38, said double check valve device will operate to establish communication between passages 49 and 47 whereupon fluid under pressure from passage 49 will flow to passage 47 and thence through the variable load valve device 40 to passage 46 and to the relay valve device 33 whereby the relay valve device will be operated to supply fluid at a corresponding pressure to the brake cylinder device 19 for effecting an application of the pneumatic brakes on the car at the same time as the dynamic brakes are effective in order to provide the desired retardation of the car.

The car will thus be braked by the dynamic brake alone, or by the addition of fluid pressure provided in the brake cylinder device 19 and as limited by operation of the inshot valve device 36, until the speed of the car reduces to a chosen low degree at which time the output of the car motors 11, 12, 13 and 14 will become so reduced that spring 79 in the lockout magnet device 37 will unseat valve 76 and seat valve 75 to close the straight air pipe passage 77 to passage 49 whereby the pressure of fluid in the brake cylinder device 19 will be increased to that provided in the straight air pipe passage 77 and in the straight air pipe 3 to provide such braking of the car as required to bring the car to a stop after the effectiveness of the dynamic brake has become reduced to a negligible degree.

In order to release an application of brakes on the car effected in the manner just described the operator need only return the brake valve handle 114 to either release or running position for effecting operation of the self-lapping valve device 124 to release fluid under pressure from diaphragm chamber 122 in the master switch device 116 for permitting operation of said switch device to effect energization of the release magnet 83 and thereby release the fluid under pressure from the straight air pipe passage 77 and straight air pipe 3 and thereby from the relay valve device 33 by way of the variable load valve device 40 and the double check valve device 42, whereupon said relay valve device will operate to release the fluid under pressure from the brake cylinder device 19 to release the pneumatic brake on the car. Also when the brake valve handle 114 is returned to its release or running position the dynamic brake wire 8 will be disconnected from the battery wire 9 whereby the lockout relay device 29 will operate to open the dynamic brake circuit above mentioned.

Now assume that with the brake valve handle 114 in the release or running position with the brakes on the vehicle released the operator desires to effect an emergency application of the brakes. To accomplish this he will move the handle 114 to emergency position in which the dynamic brake wire 8 is not connected to the battery wire 9 so that the dynamic brake on the car remains ineffective under this condition. In emergency position of handle 114 the emergency valve 133 is however opened for effecting a sudden reduction of pressure in the brake pipe 2 for causing operation of the emergency valve device 38 to its emergency position for connecting passage 64 from the supply reservoir 23 through the port 65 and cavity 56 in the main emergency slide valve 55 to passage 48 leading to the lower end of the double check valve device 42. This operation of the emergency valve device 38, through operation of the vent valve 71 also effects a further sudden reduction in pressure in the brake pipe 2 at the emergency valve device for causing the emergency valve device on the next car of a train to operate in like manner and thus serially through a train.

When the pressure of fluid in the brake pipe 2 is reduced as just described, the emergency contactor 27 will respond when the pressure becomes reduced to a chosen low degree to disconnect the dynamic brake lockout relay 29 on the car from the dynamic brake wire 8, to disconnect the release magnet 83 from the release train wire 6, 7 on the car whereby said magnet will be deenergized to permit closing of valve 84, and to disconnect wire 100 from the application train wire 5 and connect it to wire 101 which may be supplied with current from the battery supply train wire 9, whereby magnet 80 of the application magnet valve device 34 will be energized to open valve 81. The valve 81 will thus be maintained open as long as the emergency contactor 27 is in the position connecting wire 100 to wire 101, as a result of which, fluid at feed valve pressure in the passage 43 will equalize into passage 77 and the straight air pipe 3. With the dynamic brake ineffective and the lockout magnet 74 as a consequence deenergized such fluid in passage 77 will become effective past the open valve 76 in the lockout magnet valve device 37 in the passage 49 leading to the upper end of the double check valve 42. The opposite end of the double check valve device 42 will thus be subjected to, respectively, pressure of fluid provided by the emergency valve device 38 and by energization of the application magnet valve device 34 and whichever pressure predominates will shift the double check valve to the position for opening passage 47 to the predominating pressure whereby such pressure will become effective in the brake cylinder relay valve device 33 to actuate same to supply fluid at a corresponding pressure to the brake cylinder device 19 to apply the pneumatic brakes on the vehicle which will bring the car to a stop, the dynamic brake being ineffective under this condition as hereinbefore described.

In order to release an emergency application of brakes effected as just described the brake valve handle 114 will be moved to full service position to open the emergency application release valve 131 to permit supply of fluid under pressure from the feed valve pipe 31 to the brake pipe 2 for in the first place, returning the emergency valve device 38 to its normal position in which it is shown in the drawing for disconnecting the fluid pressure supply passage 62 from passage 48 and for opening the latter passage to atmosphere. The release of fluid under pressure from passage 48 and the lower end of the double check valve device 42 will not however, result at this time in release of fluid under pressure from the brake cylinder device 19 since the pressure of fluid is still effective in passage 49 at the opposite end of the double check valve device and thereby will become effective in passage 47, if not already effective, to hold the brake relay valve device 33 in the position for supplying fluid under pressure to the brake cylinder device 19. When the pressure of fluid in the brake pipe 2 subsequently becomes increased to a degree sufficient to actuate the piston 92 against spring 94 in the emergency contactor 27, said piston will operate contact 96 to reconnect the dynamic brake lockout relay 29 on the car to the dynamic brake train wire 8, and also the contact 98 to reconnect magnet 83 of the release magnet valve device 35 to the release train wire 6, 7, and the contact 99 to disconnect wire 100 from wire 101 and reconnect wire 100 to the application train wire 5 after which the brake valve handle 114 may be returned to its release or running position for operating the self-lapping valve device 124 to release fluid under pressure from chamber 122 in the master switch device 116 whereby said switch device will operate to effect energization of the release magnet 83 and thereby opening of valve 84 for releasing fluid under pressure from passage 77 and the straight air pipe 3 to atmosphere. As fluid under pressure is thus released from passage 77 it will also be released from passage 49 through the deenergized lockout magnet valve device 37 whereupon fluid under pressure will be released from the brake cylinder relay valve device 33 by way of passages 46, 47 and 49, and said relay valve device will operate to effect release of fluid under pressure from the brake cylinder device 19 for releasing the pneumatic brakes on the car.

It is to be noted that when an emergency application of brakes is effected on the car as above described that operation of the emergency contactor device 27 in response to reduced pressure of fluid in brake pipe 2 disconnects the application magnet 80 from the master switch device 116 and connects it directly to a source of electric current separate from said switch device so that said magnet will remain energized to provide and maintain fluid in the straight air pipe 3 at the same pressure as that supplied by the feed valve device to passage 43, and therefore in excess of that which would be permitted in the straight air pipe 3 if under this condition, the application magnet valve device 34 were controlled by the master switch device 115. This is of importance in connection with the operation that is now to be described.

Now let it be assumed that the brake valve handle 114 is in the service application zone between running position and full service position causing the dynamic brake on the car to be effective and providing in the straight air pipe 3, through operation of the master switch device 116 and the application magnet valve device 34, fluid at a pressure corresponding to the position of said handle, and that the inshot valve device 36 is either preventing an application of pneumatic brakes on the car or limiting such application as above described. Now let it be assumed that with the brake valve handle 114 still positioned between running and full service positions and with the dynamic brake on the car effective, a sudden reduction in brake pipe pressure is initiated by operation of the vent valve device 136 associated with the brake valve device in response to operation of either a trip valve device 24, a conductor's valve device 21 or release of pressure on handle 144 of the power controller device 15. This sudden reduction in pressure in the brake pipe 2 will cause the emergency valve device 38 on the car to operate as before described to supply fluid under pressure to passage 48 while the emergency contactor device 27 will operate immediately following or about the same time as the emergency valve device operates to connect wire 100 from the application magnet valve device 34 to the battery wire 9 whereby the magnet 80 of the application magnet valve device will be energized to open valve 82 and supply fluid to the straight air pipe 3 at the pressure provided by the feed valve 32 in passage 43. As the emergency contactor 27 operates as just described in response to the sudden reduction in brake pipe pressure the dynamic brake on the car will be rendered ineffective by disconnecting the lockout relay 29 from the dynamic brake wire, the lockout magnet 74 will as a result become deenergized, and fluid at the pressure supplied by the application magnet valve device to passage 77 will then flow past the open valve 76 in the lockout magnet valve device 37 to passage 49 leading to the upper end of the double check valve device 42 whereby the brakes on the car will be applied either by fluid supplied by the emergency valve device 38 to passage 48 or by the fluid under pressure supplied to passage 49 in the manner above described.

Under the condition being considered with the brake valve handle 114 between running and full service positions and the dynamic brake on the car applied and a sudden reduction in brake pipe pressure initiated by any means other than the brake valve device, it will be noted that the dynamic brake on the car is rendered ineffective and the pneumatic brakes on the car are applied either by fluid under pressure supplied by the emergency valve device 38 or the application magnet valve device 34, said magnet valve device operating in this manner independent of control by the master switch device 116 due to being disconnected from the application train wire 5 and connected to the local electric supply wire 9 on the car.

If a number of cars provided with the above described equipment are connected in a train the handle 114 on all brake valve devices 20 in the train will be removed in the handle-off position except at the front end of the leading car where the handle will be applied to the brake valve device. The brake pipe 2 and straight air pipe 3 will be connected between cars and thereby extend from end to end of the train as will also the application wire 5, the release wire 6, 7, the dynamic brake wire 8 and the battery supply wire 9.

With a train of cars thus equipped and connected, if the brake valve handle 114 is moved to any position between running and full service positions, the dynamic brakes on all cars will become effective simultaneously and the application magnets 80 and release magnets 83 on all cars of the train will operate simultaneously, whereby braking on all cars of the train either dynamically or through the medium of said magnets will occur simultaneously as will be clear from the above description of the operation of the brake equipment on a single car. If the brake valve handle 114 at the control station is moved to emergency position for effecting an emergency reduction in pressure in the brake pipe 2 at the brake valve device the emergency valve device 38 on the first car will respond to such reduction and through the medium of the vent valve 69 therein, such reduction will be transmitted to the emergency valve device on the next car of the train, whereby the emergency valve devices on all cars will operate serially from the front of the train to the rear to supply fluid under pressure to passage 48 in the respective bracket 30. Substantially at the same time or immediately following operation of the emergency valve devices 38 the emergency contactor devices 27 will also operate serially from car to car through the train to disconnect the dynamic brake means on the car from the dynamic brake wire and to connect the application magnet 80 on each car to the current supply train wire 9, whereby the application magnets 80 on the cars will serially operate immediately following the respective emergency valve devices in order to supply fluid at the pressure in the feed valve passage 43 to the straight air pipe 3 and to the upper end of the double check valve device 42 on each car, whereby the brakes on the cars will be serially applied from the front end of the train to the rear either by fluid under pressure supplied by the emergency valve devices 38 or by energization of the application magnets 80 on the cars, as above described.

Now let it be assumed that the operator's control handle 114 is in a position between running position and full service position in which the dynamic brakes on all cars are effective and the straight air pipe 3 extending through the train is supplied with fluid at a pressure corresponding to the position of said handle and that under this condition a sudden reduction in pressure in the brake pipe 2 is initiated by any means other than the brake valve device 20 at the control station, such as by operation of a conductor's valve device 21, operation of a trip device 24 or release of manual pressure on the safety control handle 143 of the power controller 15 at the leading end of the train. In response to such reduction the emergency valve devices 38 throughout the train will serially operate as above described to supply fluid under pressure to the passage 48 in the bracket 30 on each car, and at substantially the same time the emergency contactors 27 will also operate serially from car to car through the train to disconnect the dynamic brake means on the cars from the dynamic brake wire 8 to thereby serially render the dynamic brakes on the cars ineffective. The serial operation of the emergency contactors 27 will also effect serial energization of magnets 80 of the application magnet valve devices 34 on the cars at substantially the same time or immediately following operation of the respective emergency valve devices 38 on the cars for thereby providing in the straight air pipe 3 throughout the train and in the respective passages 77 in brackets 30 fluid at the pressure provided by the feed valve devices 32 in the passages 43 in said brackets. Fluid thus provided in passage 77 on each car will, with the dynamic brake on the car ineffective and the lockout magnet 74 hence deenergized, become effective in passage 49 and the brakes on the car will then be applied by fluid under pressure supplied to either passage 48 or to passage 49 as above described.

It is desired to point out that in the operation just described the emergency valve device 38 and the emergency contactor 27 on each car will respond substantially at the same time, or immediately one following the other, to the emergency reduction in pressure in the brake pipe 2, immediately followed by energization of the respective application magnet 80, and that, in a train, this occurs serially from car to car throughout the train from the point of initiating the emergency reduction in brake pipe pressure, whereby on all cars of the train the dynamic brakes are rendered ineffective before or at substantially the instant the pneumatic brakes begin to apply, which is very desirable since if both were effective at the same time slippage and damage of car wheels might occur particularly if a car were empty or lightly loaded.

It is not necessary that the application magnets 80 throughout the train be energized in order to effect an application of brakes on the car under the condition just described since the brake application will be satisfactorily effected solely by operation of the emergency valve devices 38, but it is necessary that magnets 80 be energized with the emergency contactors 27 in the position which they assume in response to an emergency reduction in brake pipe pressure in order to effect a release of brakes on the car if the compressor on that car is not operating.

For example, let it be assumed that the compressor on the first car is not operating to charge the main reservoir 22 thereon and that an emergency application of brakes throughout the train has been effected either by operation of the brake valve handle 113 or by operation of any device, such as a conductor valve device 21, with handle 114 in a position between running and full service positions. Now let it be assumed that the brake valve handle 114 is moved to full service position for opening the emergency application release valve 131 to connect the feed valve pipe 31 on the first car, and which pipe is not connected between cars, to the brake pipe 2 extending through the train. Fluid under pressure in the main reservoir 22 on the first car, with the compressor not operating, may not be sufficient to increase the pressure in the feed valve pipe 31 and thence in the brake pipe 2 throughout the train to a degree for effecting movement of the parts of the emergency valve devices 38 to their release position. However, with the application magnets 80 throughout the train energized, with the brake valve handle 114 in full service position, connecting the feed valve passage 43 on each car to the straight air pipe 3, fluid under pressure from the main reservoir 22 on all cars to the rear of the first car will flow to and through the straight air pipe 3 to the first car and thence past the open application magnet valve 81 on the first car to the feed valve passage 43 and thence past the open emergency application release valve 131 in the brake valve device to the brake pipe 2, whereby the pressure of fluid in the brake pipe throughout the train will be increased by fluid under pressure supplied by the compressors on the other cars. After the pressure of fluid in the brake pipe 2 has thus been built up to a degree sufficient to move the emergency valve devices 38 to their normal position, in which the emergency valve device 38 is shown in the drawing, the emergency valve devices on all cars will connect the feed valve passage 43 on each car to the brake pipe 2 on that car by way of cavity 60 in the main emergency slide valve 55 and choke 62 whereby the brake pipe pressure will be further increased by this local supply on each car as well as by way of the open valve 131 in the brake valve device 20. When the brake pipe pressure is thus further increased to a degree sufficient to operate the emergency contactors 27 throughout the train the application magnet valve devices 34 on all cars will be connected to the application train wire 5 and thence to the master switch device 116 on the control brake valve 20, whereupon the brake valve device may be moved to release position for effecting simultaneous deenergization of the application magnets 80 and energization of the release magnets 83 throughout the train for effecting release of brakes on all cars in the train.

Summary

This invention consists of the structure including the emergency contactor 27 whereby upon an emergency reduction in pressure in brake pipe 2 the application magnet 80 is disconnected from the application train wire 5 and connected to a local source of electric current, such as in wire 9, whereby in a train of cars the application magnets 80 on the cars will become energized serially only along with the serial operation of the emergency valve device 39 and emergency contactors 27 on the respective cars in order to prevent an application of brakes on the cars by fluid under pressure supplied by energization of the application magnets 80 before rendering the dynamic brake on the cars ineffective by the serial operation of the emergency contactor 27. With this arrangement the dynamic brakes and pneumatic brakes on any car in the train cannot both be effective under a condition where an emergency application of brakes is initiated by means other than the brake valve device and with the brake valve handle 114 in its service application zone between the running and full service positions calling for the dynamic brakes to be effective, thereby avoiding the possibility of sliding of the car wheels which might occur if the pneumatic brakes become effective before the dynamic brakes were rendered ineffective.

Having now described the invention what we claim as new and desire to secure by Letters Patent is:

1. A vehicle brake apparatus comprising in combination electric braking means, electro-pneumatic braking means, means including a first train wire for controlling said electric braking means, means including a second train wire for controlling said electro-pneumatic braking means, a source of electric energy, and emergency means for simultaneously disconnecting both of said braking means from the respective train wires and for connecting said electro-pneumatic braking means to said source of electric energy.

2. A vehicle brake apparatus comprising in combination electric braking means, electro-pneumatic braking means, means including a first train wire for controlling said electric braking means, means including a second train wire for controlling said electro-pneumatic braking means, a source of electric energy, a normally charged emergency train pipe, and means responsive to a reduction in pressure in said train pipe to disconnect both of said braking means from the respective train wires and to connect said electro-pneumatic braking means to said source of electric energy.

3. A vehicle brake apparatus comprising in combination an application magnet operative upon energization to effect braking of said vehicle, electric brake control means operative upon energization to effect braking of said vehicle, two train wires, a train brake pipe, a source of electric energy, and emergency means normally connecting said magnet to one of said wires and said electric brake control means to the other and operative in response to a reduction in pressure in said pipe to disconnect said magnet and electric brake control means from said wires and to connect said magnet to said source of electric energy.

4. A vehicle brake apparatus comprising in combination a first train wire, a second train wire, a normally charged emergency train pipe, electric braking means for braking said vehicle in response to supply of electrical energy to said first train wire, electro-pneumatic braking means for braking said vehicle in response to supply of electrical energy to said second train wire, means controlled by said electric braking means to prevent braking of said vehicle by said electro-pneumatic braking means with the effectiveness of said electric braking means above a chosen degree, an operator's control device for supplying electric current to both of said wires, a source of electric current, and emergency means adapted to operate in response to a reduction in pressure in said pipe to disconnect both of said braking means from the respective train wires and to connect said electro-pneumatic braking means to said source of electric current.

5. In a vehicle brake apparatus, in combination, electric braking means for said vehicle, a first train wire for supplying electric current to effect operation of said electric braking means, a straight air train pipe, pneumatic braking means adapted to respond to fluid under pressure in said pipe for effecting an application of brakes on said vehicle, an application magnet device operative upon energization of said magnet to supply fluid under pressure to said straight air pipe, an application train wire adapted to be connected to said magnet for conveying electric energy to said magnet to energize same, means responsive to effectiveness of said electric braking means only above a chosen degree for disconnecting said pneumatic braking means from said straight air pipe, an operator's control device comprising a handle having a service braking zone, means responsive to movement of said handle in said zone to supply electric energy to said first train wire, and self-lapping means responsive to operation of said handle for supplying electric energy to said application train wire to energize said magnet and comprising means responsive to pressure of fluid in said straight air pipe to cut off supply of electric energy to said application train wire upon said application magnet device providing fluid in said pipe at a pressure corresponding to the position of said handle in said zone, an emergency train pipe, a source of electrical energy, emergency means responsive to a reduction in pressure in said emergency train pipe to render said electric braking means ineffective, to disconnect said application magnet from the respective train wire, and to connect said application magnet to said source of electric energy, and means for reducing the pressure of fluid in said emergency train pipe.

6. In a vehicle brake apparatus, in combination, electric braking means for said vehicle, a first train wire for supplying electric current to effect operation of said electric braking means, a straight air train pipe, pneumatic braking means adapted to respond to fluid under pressure in said pipe for effecting an application of brakes on said vehicle, an application magnet device operative upon energization of said magnet to supply fluid under pressure to said straight air pipe, an application train wire adapted to be connected to said magnet for conveying electric energy to said magnet to energize same, means responsive to effectiveness of said electric braking means only above a chosen degree for disconnecting said pneumatic braking means from said straight air pipe, an operator's control device comprising a handle having a service braking zone, means responsive to movement of said handle in said zone to supply electric energy to said first train wire, and self-lapping means responsive to operation of said handle for supplying electric energy to said application train wire to energize said magnet and comprising means responsive to pressure of fluid in said straight air pipe to cut off supply of electric energy to said application train wire upon said application magnet device providing fluid in said pipe at a pressure corresponding to the position of said handle in said zone, an emergency train pipe, a source of electrical energy, emergency means responsive to a reduction in pressure in said emergency train pipe to render said electric braking means ineffective, to disconnect said application magnet from the respective train wire, and to connect said application magnet to said source of electric energy, means operable by said handle in an emergency position thereof to effect a reduction in pressure of fluid in said emergency train pipe, and other means for also effecting a reduction in pressure in said train pipe.

7. In a vehicle brake apparatus, in combination, electric braking means for said vehicle, a first train wire for supplying electric current to effect operation of said electric braking means, a straight air train pipe, pneumatic braking means adapted to respond to fluid under pressure in said pipe for effecting an application of brakes on said vehicle, an application magnet device operative upon energization of said magnet to supply fluid under pressure to said straight air pipe, an application train wire adapted to be connected to said magnet for conveying electric energy to said magnet to energize same, means responsive to effectiveness of said electric braking means only above a chosen degree for disconnecting said pneumatic braking means from said straight air pipe, an operator's control device comprising a handle having a service braking zone, means responsive to movement of said handle in said zone to supply electric energy to said first train wire, and self-lapping means responsive to operation of said handle for supplying electric energy to said application train wire to energize said magnet and comprising means responsive to pressure of fluid in said straight air pipe to cut off supply of electric energy to said application train wire upon said application magnet device providing fluid in said pipe at a pressure corresponding to the position of said handle in said zone, an emergency train pipe, a source of electrical energy, emergency means responsive to a reduction in pressure in said emergency train pipe to render said electric braking means ineffective to disconnect said application magnet from the respective train wire, and to connect said application magnet to said source of electric energy, emergency valve means responsive to said reduction in pressure in said emergency train pipe to supply fluid under pressure for effecting an application of brakes, and means for effecting said reduction in pressure in said emergency train pipe.

8. In a vehicle brake apparatus in combination, a train brake pipe, emergency valve means operative upon charging said brake pipe to establish a fluid pressure charging communication to said brake pipe and operative in response to an emergency reduction in pressure in said brake pipe to close said communication and to supply fluid under pressure to effect an application of brakes on said vehicle, a straight air train pipe, means adapted to respond to pressure of fluid in said straight air pipe to also effect an application of brakes on said vehicle, an application magnet operative upon energization to effect supply of fluid under pressure to said straight air pipe and upon deenergization to cut off such supply, an application train wire for conveying electric energy to said magnet, electro-dynamic brake means for braking said vehicle, a dynamic brake train wire for conveying electric energy to said electro-dynamic brake means for rendering same effective, lockout means controlled by the effectiveness of said dynamic brake means to prevent operation of said straight air pipe pressure responsive means with the effectiveness of said dynamic brake means above a chosen degree, an operator's brake valve device comprising a control handle having one position for deenergizing said train wires, and having a service brake application zone for supplying electric energy to said dynamic brake train wire and comprising self-lapping means controlled jointly by said handle and pressure of fluid in said straight pipe for supplying and cutting off supply of electric current to said application train wire to provide fluid in said straight air pipe at a pressure corresponding to the position of said handle in said zone, brake pipe charging means operable in one position of said handle in said zone to supply fluid under pressure to said brake pipe and in all other positions of said handle to cut off said supply, and an emergency contactor operable by pressure of fluid in said brake pipe to connect said application magnet and electro-dynamic brake means to, respectively, said application train wire and dynamic brake wire and operable upon a reduction in pressure in said brake pipe to disconnect said application magnet and electro-dynamic brake means from respectively said application train wire and dynamic brake wire and to supply electric energy to said magnet independent of said brake valve device, and means for effecting a reduction of pressure in said train brake pipe.

CLAUDE M. HINES.
WALTER B. KIRK.

REFERENCES CITED

The following references are of record in the file of this patent:

UNITED STATES PATENTS

| Number | Name | Date |
|---|---|---|
| 2,038,174 | Hewitt | Apr. 21, 1936 |
| 2,068,340 | Logan | Apr. 21, 1936 |